United States Patent [19]

Elhaus

[11] Patent Number: 4,790,706
[45] Date of Patent: Dec. 13, 1988

[54] DISTRIBUTING DEVICE FOR PLACING INTERMEDIATE ELEMENTS ONTO A LAYER OF ELONGATE MATERIAL

[76] Inventor: Friedrich W. Elhaus, Dorfstr. 21, D-7761, Moos, Fed. Rep. of Germany

[21] Appl. No.: 83,916

[22] Filed: Aug. 6, 1987

Related U.S. Application Data

[63] Continuation of Ser. No. 739,562, May 30, 1985, abandoned.

[30] Foreign Application Priority Data

Jun. 1, 1984 [DE] Fed. Rep. of Germany ....... 3420602

[51] Int. Cl.⁴ .................... B65G 57/06; B65G 57/18
[52] U.S. Cl. ........................................ 414/42; 414/82
[58] Field of Search ............... 198/463.3; 414/41, 42, 414/82; 221/233, 234

[56] References Cited

U.S. PATENT DOCUMENTS 3,161,302 12/1964 Poindexter et al. ............ 414/82 X
3,703,965 11/1972 Coats ................................ 414/42 X
3,738,510 6/1973 Mason ............................ 414/42 X
4,439,084 3/1984 Werkheiser .................... 414/82 X

FOREIGN PATENT DOCUMENTS 191854 9/1964 Sweden ............................ 414/82
1521748 8/1978 United Kingdom .

Primary Examiner—Robert J. Spar
Assistant Examiner—Janice Krizek
Attorney, Agent, or Firm—Willian Brinks Olds Hofer Gilson & Lione Ltd.

[57] ABSTRACT

A distributing device for placing intermediate elements onto a layer of elongate material such as aluminum sections or the like to form a material stack (3) in a stacker, comprises a stacking table (1) adapted to be lowered relative to the stacking plane and a roller bed (5) which includes spaced rollers (8) between two lateral chains for conveying the material (20) onto the stacking surface. At the head (7) of the roller bed (5) there is provided an intermediate-element distributor (12) adapted to be taken along thereby, said distributor being adapted to automatically and successively place intermediate elements (15) on the material layer (20).

17 Claims, 3 Drawing Sheets

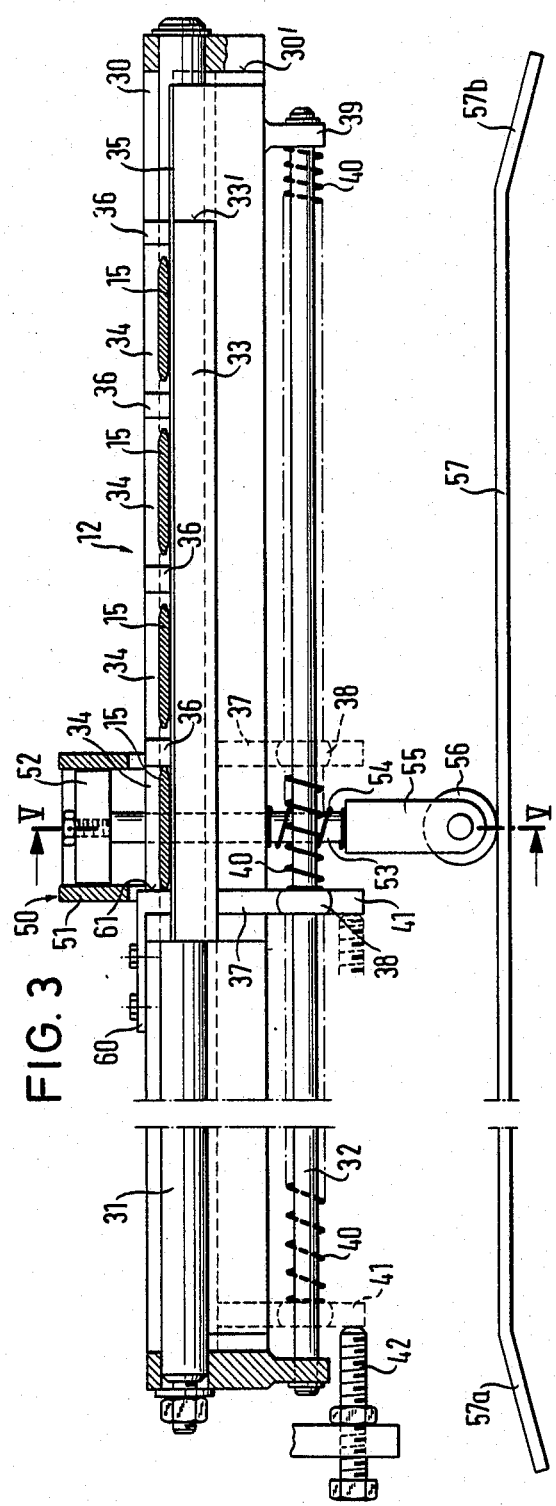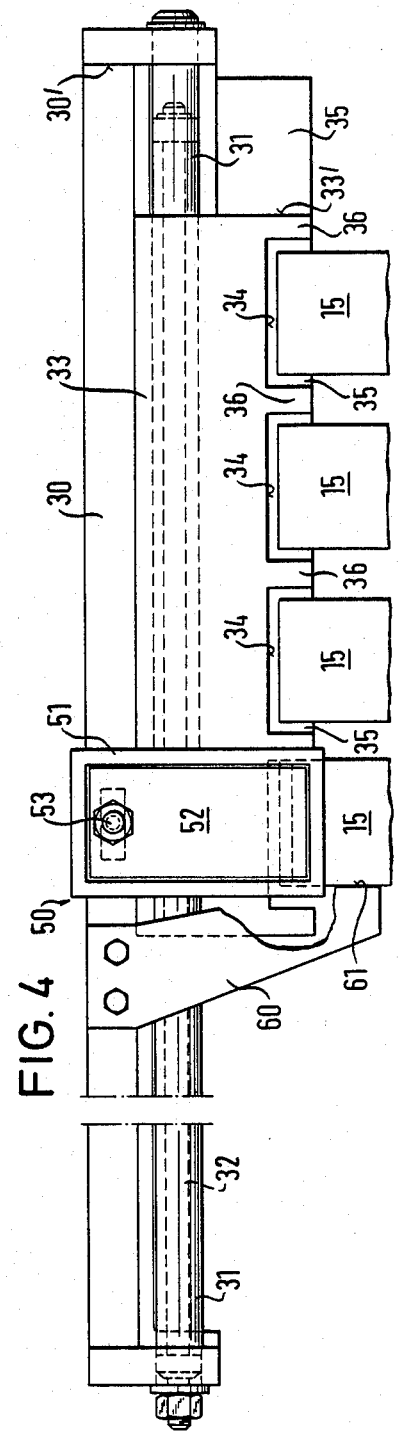

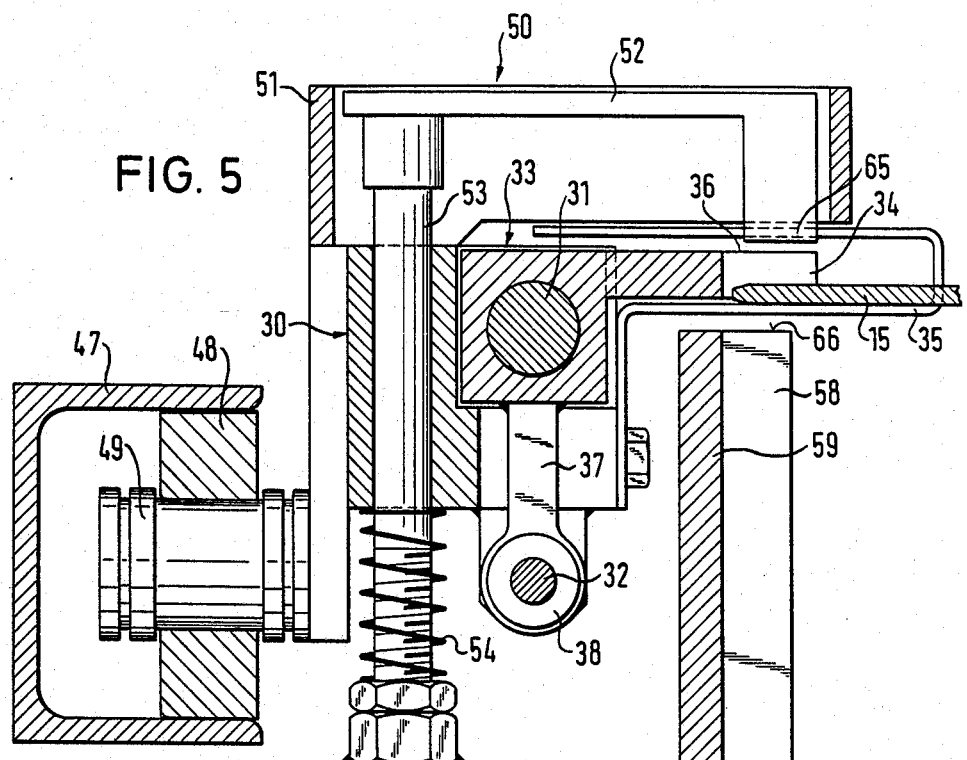
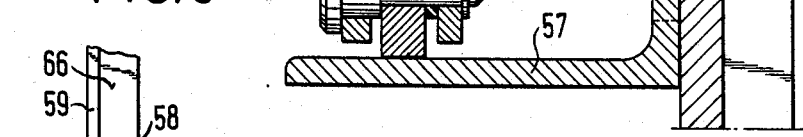
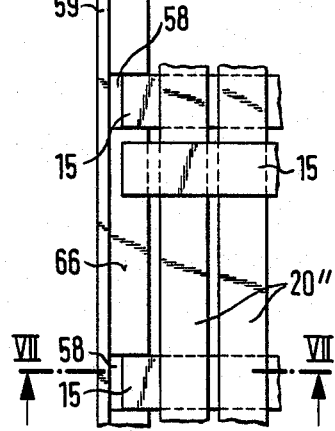
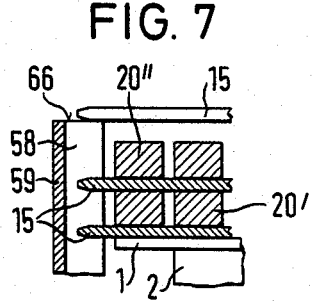

4,790,706

DISTRIBUTING DEVICE FOR PLACING INTERMEDIATE ELEMENTS ONTO A LAYER OF ELONGATE MATERIAL

This application is a continuation, of application Ser. No. 06/739,562, filed May 30, 1985, now abandoned.

BACKGROUND OF THE INVENTION

The invention is directed to a distributing device for placing intermediate elements onto a layer of elongate material such as aluminium sections or the like, to form a material stack in a stacker which comprises a stacking table adapted to be lowered relative to the stacking plane and a roller bed which includes spaced rollers disposed between two lateral chains for conveying the material onto the stacking surface and which is adapted to be removed from the stacking surface in parallel to the stacking plane.

Until recently, in order to form material layers e.g. of cut aluminium sections one has manually placed intermediate elements onto a layer of the elongate material, whereupon a fresh layer was stacked onto the intermediate elements. The intermediate elements serve the purpose of avoiding any direct contact between the individual layers and thus, for instance, of avoiding the risk of damage to the surface. The manual placing of intermediate elements is expensive, and that not only because it requires labour but also with a view to the short cycle times of modern stackers such as described, for instance, in the DE-OS No. 3,232,180.

The invention is based on the object of providing a distributing device of the kind described above, with which it is possible to place the intermediate elements on a material layer within a short period of time predetermined by the cycle time of a fast stacker, with a saving of human labour.

SUMMARY OF THE INVENTION

In order to solve this object, it is provided in accordance with the invention that at the head of the roller bed there is provided an intermediate-element distributor adapted to be taken along thereby, said distributor automatically and successively placing intermediate elements onto the material layer.

In the distributing device according to the invention, the intermediate-element distributor is coupled to the roller bed shown in the DE-OS No. 3,232,180 in such a way that the intermediate-element distributor places the intermediate elements on the respective uppermost material layer of the stack during inward movement and optionally also during pulling-away of the roller bed. It is thereby possible to achieve automatic positioning of the intermediate elements within a minimum period of time substantially during an operation that takes place in any case during stacking, viz., during pulling-away of the roller bed for lowering the uppermost layer of the material stack onto the stack disposed therebeneath and the subsequent return movement of the roller bed for receiving the next-following material layer.

In order to further shorten this operation, or strictly speaking to halve it with respect to time, a further improvement of the invention provides that two roller beds are provided which are adapted to be driven in opposition and in synchronism and each of which is provided at the head thereof with an intermediate-element distributor of its own. Each of the two intermediate-element distributors has to place only half the number of intermediate elements onto a material layer, and by virtue of the correspondingly halved path length of the roller bed this may be effected within half the time as compared to a structure comprising only one roller bed and only one intermediate-element distributor.

An advantageous improvement of the distributing device of the invention provides that the or each intermediate-element distributor has associated therewith a stationary magazine and a feeder for feeding a number of intermediate elements to the intermediate-element distributor which is retracted from the stacking location, said number being sufficient to fully cover the material layer.

A structural embodiment of the invention is characterized in that the or each intermediate-element distributor comprises a compartment section which includes a plurality of compartments in side-by-side relationship for receiving intermediate elements and an ejector adapted to be successively moved to an operative position relative to said receiving compartments.

Preferably, the ejector is biased in ejecting direction by means of a biasing force, especially a spring, and in its inoperative state is held by a stationary guide rail which cooperates with a cam roller mounted on the ejector This guide rail may be lowered and/or interrupted towards those locations of the stacking surface where intermediate elements are to be laid down, which results in a downward movement and thus in the ejection of the intermediate element in said locations preferably in vertical grooves, which may be provided for receiving the intermediate elements in lateral boundary edges of the stacking surface. In the final stage of movement of the compartment section prior to reaching the ejecting position, these boundary edges may serve as sliding surfaces for guiding the intermediate element to be ejected.

Advantageously, the ejector is fixedly mounted on the intermediate-element distributor and the compartment section is movably mounted thereon, and the compartment section while being loaded with intermediate elements is biased against the action of a spring into an initial position from which the spring, after ejection of the first intermediate element, displaces the compartment section with the respective next-following receiving compartment into the ejecting position at the intermediate-element distributor. The aforementioned spring may be biased in a simple manner against a stationary stop member in the vicinity of the feeding position of the intermediate-element distributor when the roller bed moves away from the stacking surface.

Thus, in the preferred configuration of the invention both the spring for actuating the ejector and the spring for displacing the respective receiving compartment are automatically biased to the ejecting position by stationary members provided on the frame of the stacker.

BRIEF DESCRIPTION OF THE DRAWINGS

Embodiments of the invention will be described below in detail with reference to the drawing, in which FIG. 1 is a partially sectional side view of a stacker including a distributing device according to the invention;

FIG. 2 is an enlarged view showing a detail of the stacker of FIG. 1, with the distributing device according to the invention in loading position;

FIG. 3 and

FIG. 4 are a partially sectional side view and a plan view, respectively, showing an intermediate-element FIG. 5 is an enlarged-scale partial sectional view along the line V—V of FIG. 3;

FIG. 6 and

FIG. 7 are a partial plan view and a sectional view along the line VII—VII, respectively, showing an intermediate element shortly before it reaches the piling position on a layer of material.

DESCRIPTION OF THE PREFERRED EMBODIMENT

Figures 1, 2:
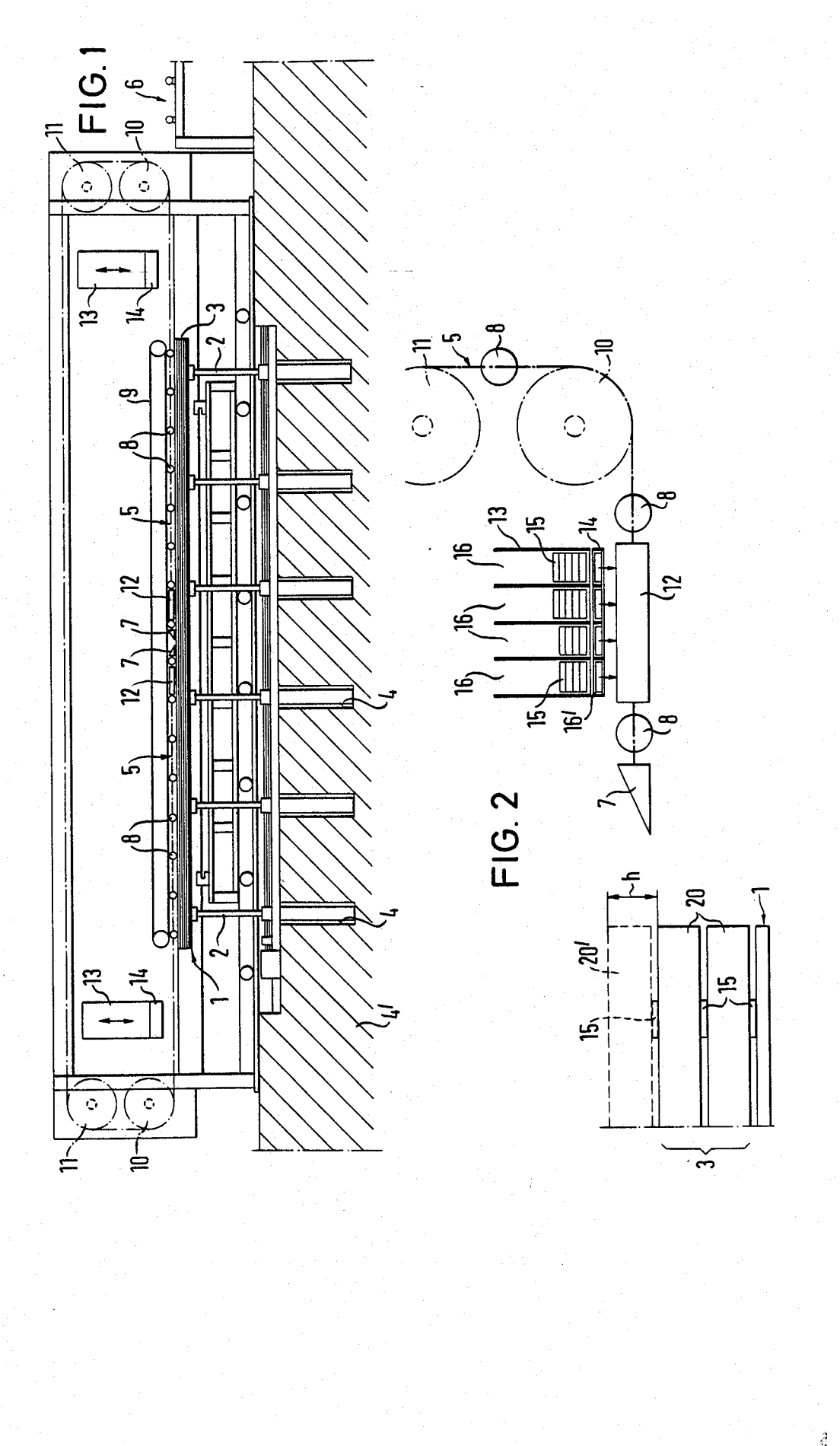

The stacker shown in FIG. 1 comprises a stacking table 1 including a total of six lifting supports 2 arranged in parallel, which are adapted to be synchronously lowered into recesses 4 provided in the base by means of a drive system (not illustrated) with increasing thickness of the stack 3 to be formed of elongate material such as cut aluminium sections.

Above the stack 3, two roller beds 5,5 are provided as an extension of a roller conveyor 6 across which the material to be stacked is delivered. The roller beds are adapted to be synchronously pulled apart from the illustrated central position, in which their heads 7,7 substantially abut each other, in opposite directions so that the stacking table will be exposed. This is necessary so that a layer of material advanced across the roller conveyor 6 may be lowered onto the material layer therebelow to thereby form a stack. The roller beds comprise chains on either side with rollers 8 disposed therebetween, which are adapted to be jointly rotated via a belt drive mechanism 9. Upon pulling-apart of each roller bed 5, the belt drive mechanism 9 will drive the rollers such that the material positioned thereon will not be moved in conveying direction but will rest above the stacking table 1.

When the roller beds 5 are pulled away, they are removed from the stacking surface along the path indicated in dashed lines by means of respective guide sprocket wheels 10, 11 of which a respective one is driven, and subsequently the roller beds are returned to the position indicated in FIG. 1.

Each of the heads 7 of the roller beds 5 is provided with an intermediate-element distributor 12 for distributing intermediate elements on a material layer in order to avoid direct contact between adjacent material layers. Each intermediate element is made of a material which cannot damage the material layer, e.g. of wood, plastics, cardboard, metal wrapped by paper, or the like. When the roller bed 5 is completely pulled away, this intermediate-element distributor 12 is brought to a position beneath a magazine 13 including an associated feeder 14 for intermediate elements 15 initially illustrated in FIG. 2. The intermediate elements 1 are adapted to be respectively placed onto a material layer at predetermined locations so as to prevent any direct contact between the individual material layers and possible damage to the material surfaces caused thereby.

In FIG. 2, which illustrates the right-hand roller bed 5 in completely retracted position, the intermediate-element distributor 12 is adjacent the wedge-like head 7 in the loading position beneath the magazine 13 and the feeder 14 for the intermediate elements 15. Magazine 13 and feeder 14 comprise four laterally adjacent compartments 16,16' for a pile of intermediate elements each. The feeder 14 is adapted to be lowered vertically downwardly relative to the magazine in the direction of the arrow towards the distributor 12, so that upon opening of the compartment bottoms of each feeder the four intermediate elements 15 contained in the feeder compartments 16' may be transferred to the intermediate-element distributor 12 which is movable together with the roller bed 5.

Then, the roller bed 5 is again moved to the left—as viewed in FIG. 2—to a position above the uppermost material layer of the stack 3, the intermediate elements 15 being laid down at predetermined spacings in the dashed-line position shown in FIG. 2. Thereupon the next material layer 20' is moved along the rollers 8 of the roller bed into the stacker and by renewed pulling-apart of the two roller beds 5 is placed in the dashed-line position shown in FIG. 2 onto the intermediate elements 15 laid down previously. By lowering the lifting supports 2, the table 1 is subsequently lowered by the amount of the lift h, which is composed of the thickness of a material layer and an intermediate element.

Below, structure and operation of each intermediate-element distributor 12 will be explained in detail with reference to FIGS. 3 to 5.

Each intermediate-element distributor 12 comprises a guide section 30 which is movable in fixed guide rails 47 by means of rollers 48 supported on trunnions 49 fixedly connected to the guide section 30 and which is coupled to one of the roller conveyors 6 (see FIGS. 3, 1), said guide section including an upper large-diameter guide bar 31 and a lower small-diameter spring guide bar 32. Along the guide bar 31 there is provided a compartment section 33 having four receiving compartments 34 disposed in side-by-side relationship for receiving the ends of intermediate elements 15, the receiving compartments being open towards said ends and being separated from each other by walls 36. Three of the receiving compartments 34 include a bottom formed by a plate 35 secured to the guide section 30. A stop lug 38 adapted to slide along the spring guide bar 32 is integrally formed with an arm 37 depending from the compartment section 33. A compression spring 40 is fitted to the lower spring guide bar 32 intermediate the stop lug 38 and a securing lug 39 for the spring guide bar 32, said securing lug depending downwardly from the guide section 30. In the illustrated position, the compression spring is shown to be biased between the stop lug 38 at the compartment section 33 and the securing lug 39. Thus, the compression spring 40 urges the compartment section 33 via the arm 37 towards the left as viewed in FIGS. 3 and 4. The two extreme positions of the arm 37 and thus of the compartment section 33 are indicated in dashed lines in FIG. 3 on the extreme left (compression spring 40 relaxed) and to the right of the full-line position (maximum biased state of compression spring 40; the compartment section 33 with its right-hand end 33' abuts the end wall 30' of the guide section 30). The arm 37 includes an extension 41 adapted to cooperate as a tensioning abutment with a stationary stop screw 42. This will happen when, after the intermediate-element distributor 12 has been emptied, the compression spring 40 has urged the compartment section 33 to the extreme left in FIGS. 3 and 4 and the extension 41 upon retraction of the roller bed 5 engages the stop screw 42, which is fixedly mounted in the region of the feeder 14. Thereby the compartment section 33 is retained and biases the compression spring 40, while the guide section 30 is moved further by the roller bed to its end position towards the left (dashed-line extreme right position of the arm 37).

At the level of the leftmost receiving compartment 34 (in FIGS. 3 and 4) of the compartment section 33 there is provided an ejector 50. The ejector 50 comprises an ejector housing 51 which is fixedly connected to the guide section 30. A slide member 52 is guided for vertical reciprocating movement within the ejector housing 51. The slide member 52 comprises a rod 53 which depends vertically downwardly away from the slide member and which includes at the lower end thereof a collar portion 55 for supporting a compression spring 54 whose other, upper end engages the guide section 30. A cam roller 56 is mounted at the lower end of the collar portion 55. The cam roller 56 cooperates with a stationary horizontal guide rail 57 mounted laterally of the stacker, said guide rail having downward inclinations at its ends 57a and 57b and terminating at a distance from vertical grooves 58 (FIGS. 5 to 7) for receiving and positioning the ends of the intermediate elements 15 at predetermined locations of the sidewalls 59 of the stacker. Respective guide rails 57 extend between all of the vertical grooves 58 in the sidewalls 59.

The guide section 30 has mounted thereon a stop member 60 with a stop face 61 for the intermediate element 15 which is illustrated at the extreme left in FIGS. 3, 4.

The compartment section 33, which as described above is loaded with a total of four intermediate elements 15 at the feeder 14, is initially biased to the extreme right, as viewed in FIGS. 3 and 4, by the stop screw 42, wherein its end face 33' engages the end wall 30' of the guide section. In order to place the first intermediate element in the ejecting position beneath the ejector 50, the compartment section 33 is moved to the position illustrated in FIGS. 3 and 4 when the roller bed again moves into the stacker portion and in doing so takes along the intermediate-element distributor 12. By moving towards the extreme left intermediate element 15 at the stop face 61, the compartment section is brought to the ejecting position for this intermediate element 15 and is retained in this ejecting position against the action of the spring 40 for as long as the slide member 52 is maintained in the elevated position by the cam roller 56 riding along the rail 57 against the action of the spring 54, which is biased between the guide collar 55 and the guide section 30. When the cam roller 56 reaches the downwardly inclined terminal portion 57b of the guide 57 and finally completely leaves said guide rail, the spring 54 urges the slide member 52 downwardly via the guide collar 55, so that the slide member 52 ejects the intermediate element 15 downwardly with its end into the corresponding vertical groove 58. Since the intermediate-element distributor naturally comprises a device of identical configuration as shown in FIGS. 3, 4 and 5 on either side of the stacking table, the intermediate element 15 is placed on top of the uppermost material layer 20 (FIG. 2) with both ends being guided in opposite grooves 58.

When the cam roller 56 rides along the inclined end 57b of the guide rail 57, the slide member 52 with its ejecting end 65 (FIG. 5) engages the top of the intermediate element, which is in the ejecting position, and urges the same downwardly under the action of the spring 54, so that the ends of the element will be placed on the upper edges 66 of the lateral boundary walls 59. Since these edges 66 are configured as sliding surfaces, the intermediate element 15 in the final phase of motion before reaching the vertical groove 58 will slide under the driving action of the roller bed 5 until it finally drops into the groove 58. When the left-hand receiving compartment 34 has been emptied of the intermediate element 15, the slide member 52 simultaneously functions as stop latch to prevent movement of the compartment section 33 towards the left under the action of the compression spring 40 as long as the cam roller 56 has not yet moved onto the next-following guide rail 57. When this happens, the slide member 52 will be moved by the cam roller from its lower ejecting and latching position in an upward direction. Then, the spring may displace the compartment section 33 to the left, as viewed in FIGS. 3 and 4, until the next intermediate element 15 engages the stop face 61 of the stop member 60. Thereupon the above-described operations are repeated until finally all four receiving compartments have been emptied while the compartment section 33 is further indexed leftwards, as viewed in FIGS. 3 and 4, to the extreme left position indicated in dashed lines at the stop screw 42. At that time, one intermediate-element distributor will have placed a total of four intermediate elements on the uppermost material layer 20 according to FIG. 2. Thus, a total of eight intermediate elements has been placed thereon by both intermediate-element distributors 12. Of course, a total of any other integer number of intermediate elements 15 may be placed equidistantly on each material layer.

The FIGS. 6 and 7 illustrate the final phase of motion of an intermediate element 15, which already slides along the sliding surface 66, prior to dropping into the groove 58. For as long as the intermediate element 15 slides along the sliding surface 66 it is still above the surface of the uppermost material layer 20" (FIG. 7).

Various other changes and modifications to the preferred embodiments described herein will be apparent to those skilled in the art. Such changes and modifications can be made without departing from the spirit and scope of the present invention and without diminishing its attendant advantages. It is, therefore, intended that all such changes and modifications be covered in the following claims.

What is claimed is:

1. A distributing device for placing intermediate elements onto a layer of elongate material such as aluminum sections to form a material stack in a stacker which comprises a stacking table adapted to be lowered relative to a stacking plane said distributing device comprising:
   two roller beds each including a head and spaced rollers for conveying material into a stacking location over the stacking table and within the stacking plane, each of said roller beds being adapted to be removed from the stacking location in a direction parallel to the stacking plane and adapted to be driven oppositely and in synchronism,
   an intermediate-element distributor positioned at the head of each of said roller beds and adapted to be taken along thereby, said distributor successively placing intermediate elements onto the material layer as said roller bed is removed from the stacking location.

2. The distributing device as claimed in claim 1, further comprising a stationary magazine and a feeder associated with each intermediate-element distributor for feeding to the associated intermediate-element distributor a sufficient number of intermediate elements to fully cover the material layer.

3. The distributing device as claimed in claim 1, wherein each intermediate-element distributor comprises a compartment section which includes a plurality of laterally adjacent compartments for receiving intermediate elements and an ejector adapted to be successively moved to its operative position relative to said receiving compartments.

4. The distributing device as claimed in claim 3, wherein the ejector is biased by means of a biasing load, and in the inoperative position is held by a stationary guide rail that cooperates with a cam roller provided on the ejector.

5. The distributing device as claimed in claim 4, wherein the guide rail is inclined at predetermined positions at the stacking location where intermediate elements are to be placed.

6. The distributing device as claimed in claim 5, wherein vertical grooves for receiving the intermediate elements are provided at predetermined locations in lateral boundary walls adjacent the stacking location.

7. The distributing device as claimed in claim 6, wherein the ejector is fixedly mounted on the intermediate-element distributor and the compartment section is movably mounted thereon, and wherein the compartment section when being fed with intermediate elements is biased against the action of a spring to an initial position, from which the spring advances the compartment section with the respective nearest receiving compartment to an ejecting position past the ejector.

8. The distributing device as claimed in claim 2, wherein the feeder comprises a number of compartments in side-by-side relationship for receiving intermediate elements, said number corresponding to the number of receiving compartments, and is adapted to be lowered together with the magazine towards the intermediate-element distributor which is retracted on the path of the roller bed.

9. A distributing device for placing intermediate elements onto a layer of elongate material such as aluminum sections or the like, to form a material stack in a stacker which comprises a stacking table adapted to be lowered relative to a stacking plane and a roller bed which includes a head and spaced rollers disposed between two lateral chains for conveying the material into a stacking location over the stacking table and within the stacking plane and which is adapted to be removed from the stacking location in parallel to the stacking plane, said distributing device comprising an intermediate-element distributor positioned at the head of said roller bed adapted to be taken along thereby, said distributor successively placing intermediate elements onto the material layer as said roller bed is removed from the stacking location.

10. The distributing device as claimed in claim 9, further comprising a stationary magazine and a feeder associated with the intermediate-element distributor for feeding to the intermediate-element distributor a sufficient number of intermediate elements to fully cover the material layer.

11. The distributing device as claimed in claim 9 wherein the intermediate-element distributor comprises a compartment section which includes a plurality of laterally adjacent compartments for receiving intermediate elements and an ejector adapted to be successively moved to its operative position relative to said receiving compartments.

12. The distributing device as claimed in claim 11, wherein the ejector is biased by means of a biasing load, and in the inoperative position is held by a stationary guide rail that cooperates with a cam roller provided on the ejector.

13. The distributing device as claimed in claim 12, wherein the guide rail is inclined at predetermined positions at the stacking location where intermediate elements are to be placed.

14. The distributing device as claimed in claim 13, wherein vertical grooves for receiving the intermediate elements are provided at predetermined locations in lateral boundary walls adjacent the stacking location.

15. The distributing device as claimed in claim 14, wherein the ejector is fixedly mounted on the intermediate-element distributor and the compartment section is movably mounted thereon, and wherein the compartment section when being fed with intermediate elements is biased against the action of a spring to an initial position, from which the spring advances the compartment section with the respective nearest receiving compartment to an ejecting position past the ejector.

16. The distributing device as claimed in claim 10, wherein the feeder comprises a number of compartments in side-by-side relationship for receiving intermediate elements, said number corresponding to the number of receiving compartments, and is adapted to be lowered together with the magazine towards the intermediate-element distributor which is retracted on the path of the roller bed.

17. A distributing device as claimed in claim 9 or claim 1, in which each roller bed is removed from the stacking location in a direction parallel to the direction in which the material is conveyed into the stacking location over the stacking table.

* * * * *